(12) United States Patent
Olsen et al.

(10) Patent No.: US 6,747,442 B2
(45) Date of Patent: Jun. 8, 2004

(54) MULTIPHASE INTEGRATED DC-TO-DC VOLTAGE CONVERTER

(75) Inventors: Jeffery James Olsen, Banks, OR (US); Ferdinand Jacob Sluijs, Numegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 177 days.

(21) Appl. No.: 10/079,701

(22) Filed: Feb. 19, 2002

(65) Prior Publication Data

US 2003/0155898 A1 Aug. 21, 2003

(51) Int. Cl.$^7$ ................................................. G03F 1/40
(52) U.S. Cl. ................................................. 323/283
(58) Field of Search ........................ 323/267, 271, 323/272, 282, 283, 285, 351

(56) References Cited

U.S. PATENT DOCUMENTS

| | | | |
|---|---|---|---|
| 5,552,694 A | | 9/1996 | Appeltans |
| 5,886,513 A | | 3/1999 | Appeltans |
| 6,246,222 B1 | * | 6/2001 | Nilles et al. ................ 323/283 |
| 6,362,607 B1 | * | 3/2002 | Wickersham et al. ....... 323/272 |
| 6,377,032 B1 | * | 4/2002 | Andruzzi et al. ........... 323/224 |
| 6,465,993 B1 | * | 10/2002 | Clarkin et al. .............. 323/272 |
| 6,597,157 B1 | * | 7/2003 | Boeckmann et al. ....... 323/242 |
| 2001/0038277 A1 | | 11/2001 | Burstein et al. |

* cited by examiner

Primary Examiner—Adolf Berhane
(74) Attorney, Agent, or Firm—Aaron Waxler

(57) ABSTRACT

The present invention provides an n-phase integrated buck converter. The converter comprises a controller and a plurality of circuits each operably connected to the controller. The controller controls the plurality of circuits to respectively output a plurality of current signals each having an associated phase and generate an output voltage signal. By applying the n phase concept of the invention, the amount of current each phase (i.e., each of the plurality of circuits) has to deliver is reduced. This directly reduces the conduction losses in each phase. Because the current in each phase is lower, a smaller MOSFET in each of the plurality of circuits may be used. The smaller MOSFET is easier to switch. Therefore, the switching losses per phase are also reduced. Reducing these losses will enable the invention to achieve high efficiencies. Integration allows all of the components to become physically closer and capable of being switched faster. Faster switching frequencies allow for smaller and less passive components. Integration also minimizes the total cost of the converter.

17 Claims, 3 Drawing Sheets

MULTIPHASE INTEGRATED DC-TO-DC VOLTAGE CONVERTER

BACKGROUND OF THE INVENTION

The invention relates generally to semiconductor integrated circuit (IC) devices and more particularly, it relates to buck converters.

Buck converters are used to convert a higher voltage to a lower voltage suitable for use with, for example, a microprocessor. A buck converter typically operates using a clock, whereby an inductor is charged during a first portion of a clock cycle ("charging phase") and operates as a current source during the second portion of the clock cycle ("discharging phase"). Recently, buck converters have evolved into multi-phase buck regulators. A conventional multi-phase buck converter allows multiple low currents to be delivered via the multiple phases respectively. The sum of the inductor currents is provided as an output. Such a conventional multi-phase converter suffers from a serious drawback in that the different phases must not overlap each other. Otherwise, the controller cannot distinguish among the inductor currents generated, resulting in unstable or ineffective control. Non-overlapping phases result in much slower response time for high current output. Therefore, a conventional multi-phase converter generally cannot include more than a few phases.

Conventional multi-phase converters also suffer from the limiting factors associated with the discrete implementation, including response time, efficiency and cost. Response time is generally longer in discrete circuits due to large distances between the discrete circuit components, which result in a large time constant. Low efficiency is also associated with discrete circuits because of high switching losses. Discrete circuits are also more expense than integrated circuits.

Therefore, there is a need for an improved buck converter with superior performance.

SUMMARY OF THE INVENTION

The present invention provides a solution that addresses all of the limiting factors in the discrete buck converter. According to one embodiment of the invention, an n-phase integrated buck converter is provided and comprises a controller and a plurality of circuits each operably connected to the controller. The controller and the plurality of circuits are integrated. The controller generates a plurality of drive signals to control the plurality of circuits respectively, the plurality of drive signals each having an associated phase.

According to one aspect of the invention, the plurality of circuits generate a plurality of current signals respectively and an output voltage signal.

According to another aspect of the invention, the output voltage signal is fed back to the controller. The controller comprises a duty cycle control circuit that compares the fed-back output voltage signal with a pre-selected reference voltage and adjusts a duty cycle value of the drive signals based on the comparison to maintain the output voltage signal at a desired level.

According to a further aspect of the invention, a sum of the plurality of current signals is fed back to the controller. The duty cycle control circuit compares the sum of the fed-back current signals with previous value of the sum and adjusts a duty cycle value of the drive signals based on the comparison to maintain the output voltage signal at a desired level.

By applying the n phase concept of the invention, the amount of current each phase (i.e., each of the plurality of circuits) has to deliver is reduced. This directly reduces the conduction losses in each phase. Because the current in each phase is lower, a smaller MOSFET in each of the plurality of circuits may be used. The smaller MOSFET is easier to switch. Therefore, the switching losses per phase are also reduced. Reducing these losses will enable the invention to achieve efficiencies greater than the discrete solution since 90% of the losses in the conversion process are located in the MOSFETs.

According to the invention, the response time is shortened by integrating the controller with the power train (i.e., PMW drivers and MOSFETs). This integration reduces the parasitic inductances and capacitances that limit the converter's ability to respond quickly. Integration allows all of the components to become physically closer and capable of being switched faster. Faster switching frequencies allow for smaller and less passive components. Integration also minimizes the total cost of the converter.

Increasing the switching frequency of the converter not only shortens response time but also reduces the size of the output inductors required by the buck topology. It may be possible to increase the frequency of the converter to such a point that discrete output inductors are no longer required but that the inductance of the package itself may replace them.

Other objects and attainments together with a fuller understanding of the invention will become apparent and appreciated by referring to the following description and claims taken in conjunction with the accompanying drawings.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE PREFERRED EMBODIMENTS

Figure 1:
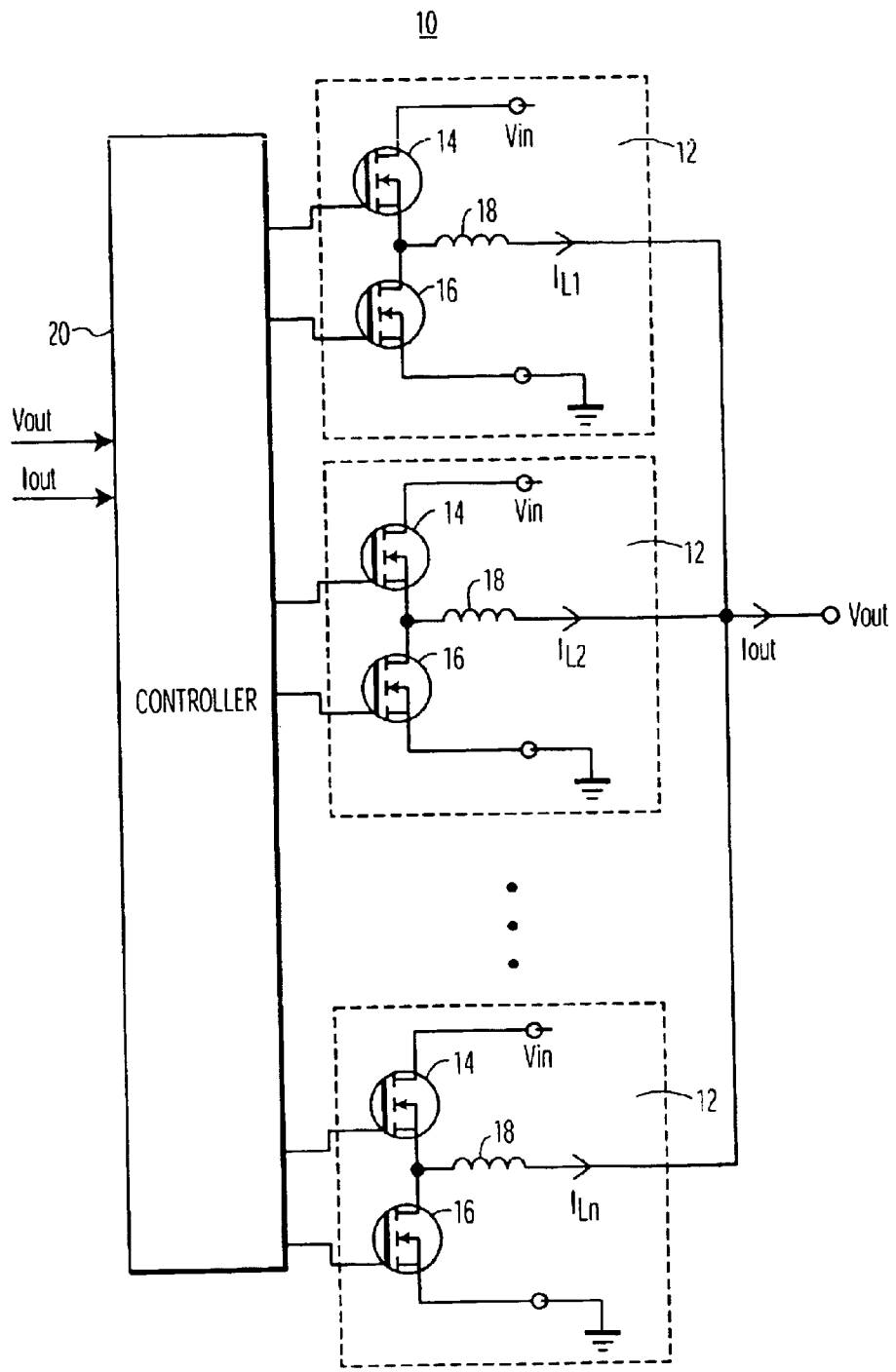
FIG. 1 shows an n-phase buck converter according to one embodiment of the invention.

FIG. 1 shows an n-phase buck converter 10 according to one embodiment of the invention. In FIG. 1, buck converter 10 comprises a plurality of, e.g., n circuits 12 all connected to an n-phase controller 20. Each circuit 12 includes a control transistor, e.g., MOSFET 14, a synchronous transistor, e.g., MOSFET 16 and an inductor 18 for generating an output current $I_L$ representing one phase of the n-phase buck converter. Although MOSFETs 14 and 16 are shown as n-type MOSFETs, they may also be p-type MOSFETs.

To operate on each circuit 12, controller 20 switches on control transistor 14 to allow an input $V_{in}$ to be coupled to inductor 18 to charge the inductor. After the inductor is charged up, controller 20 switches off control transistor 14 to decouple $V_{in}$ from inductor 18, and switches on transistor 16 to provide a current path and allow the inductor current to be discharged to the load. The inductor currents generated from n circuits 12 may have up to n phases, as will be described in detail below. The sum of the inductor currents is provided as an output current Iout to a load. In converter 10, the output voltage $V_{out}$ and current $I_{out}$ are fed back to controller 20 for adjusting PWM drive signals as will be further discussed below.

Figure 2:
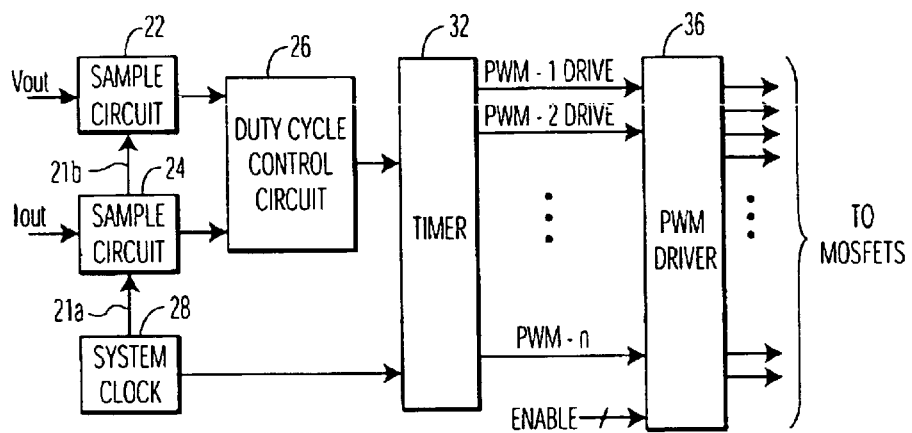
FIG. 2 shows a block diagram of the controller in the n-phase buck converter according to one embodiment of the invention.

FIG. 2 shows a block diagram of controller 20 according to one embodiment of the invention. Controller 20 comprises sample circuits 22 and 24, a duty cycle control circuit 26, a system clock 28 that provides clock signals to sample circuits 22 and 24 via signal lines 21a and 21b respectively, a timer 32, and a pulse width modulation (PWM) driver 36.

Output voltage $V_{out}$ and output current $I_{out}$ are fed back to sample circuits 22 and 24, which perform the standard hold-and-sample functions. Sample circuits 22 and 24 sample $V_{out}$ and $I_{out}$ with the system clock signals and convert them into digital pulses, i.e., the digital values of $V_{out}$ and $I_{out}$. The digital values are provided to duty cycle control circuit 26, which stores a digital value of a duty cycle in a duty cycle register and makes adjustments to it. The duty cycle is defined as $T_{on}/T_{total}$, where $T_{on}$ is the on time of a pulse and $T_{total}$ is the total length of the pulse.

Duty cycle control circuit 26 makes an adjustment of the duty cycle value whenever there is an actual difference between $V_{out}$ and $V_{ref}$ in order to make $V_{out}$ equal to $V_{ref}$. Duty cycle control circuit 26 adjusts the duty cycle value based on the measurement of $V_{out}$ compared with a pre-selected reference voltage $V_{ref}$. For example, when $V_{out}$ is less than $V_{ref}$, the duty cycle is increased by one step in order to increase the output voltage $V_{out}$ to the level of $V_{ref}$. The step size is predefined by the duty cycle resolution, which is equal to the size of the duty cycle register in the controller. One step then is the minimum step in this register, e.g., +1 or −1 in register value, or +1 (resolution) or −1 (resolution) in absolute duty cycle value. On the other hand, when $V_{out}$ is greater than $V_{ref}$, the duty cycle is reduced by one step in order to bring down the value of the output voltage to the level of $V_{ref}$.

Duty cycle control circuit 26 also reacts on an expected output voltage change due to a sudden increase or decrease of the output current $I_{out}$, in order to make $V_{out}$ equal to $V_{ref}$. Duty cycle control circuit 26 accomplishes this by comparing the digital value of $I_{out}$ with a previous value $I_{out}$ stored in control circuit 26 and adjusting the duty cycle value accordingly. For example, when $I_{out}$ is less than the previous value of $I_{out}$ by a predefined value, e.g., $I_{error}$, the duty cycle is decreased by one step in order to reduce the output voltage $V_{out}$ overshoot and keep it close to the level of $V_{ref}$. On the other hand, when $I_{out}$ is greater than the previous value of $I_{out}$ by, e.g, $I_{error}$, the duty cycle value is increased by one step in order to reduce the voltage drop of the output voltage $V_{out}$ compared to the level of $V_{ref}$.

In an alternative embodiment of the invention, only $V_{out}$ needs to be fed back to allow control circuit 26 to adjust the output voltage $V_{out}$ based on comparison of the digital values of $V_{out}$ with the reference voltage $V_{ref}$.

The adjusted duty cycle is sent to timer 32, which generates the PWM drive pulses PWM-1 drive, PWM-2 drive, . . . PWM-n drive for controlling the n circuits 12, respectively. Timer 32 counts the clock pulses and provides the PWM drive signals to realize the output pulses corresponding with the duty cycle value. The different output pulses of the PWM drive pulses may be overlapping or non-overlapping, depending on the duty cycle and the number of the active outputs (i.e., the active circuits 12).

If the duty cycle multiplied with the number of active outputs is greater than one, the PWM drive pulses will have overlapping phases. Overlapping the PWM pulses allows high speed switching at circuits 12, thus resulting in high efficiency.

When the output current $I_{out}$ is below a predetermined value, controller 20 disables some outputs of circuits 12 to reduce the switching losses. For example, when the output power is at a maximum, all outputs of circuits 12 are active. When the output power level drops to less than 50%, half of the outputs can be disabled. When the power is again reduced to 25%, the number of active outputs can be reduced to one quarter. It should be noted that this example works for multiples of four. Similar principles apply for other numbers of outputs. Thus, controller 20 of the invention can be adapted for n phases or any number less than n, depending on the application.

Figure 3:
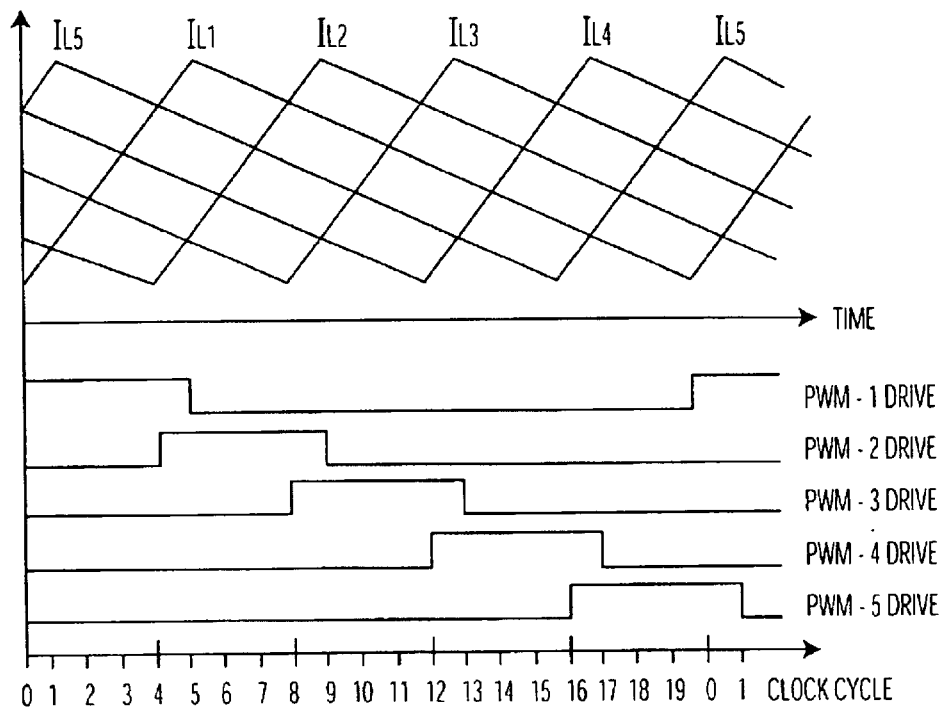
FIG. 3 illustrates an example of overlapping PWM drive pulses and the corresponding output current signals.

As an example, assume the duty cycle for each output (i.e., each PWM drive pulse) is 25% and the total time period is 20 clock cycles. Thus, the on time for each PWM drive signal is 5 (20×25%) clock cycles. Also, assume that there are 5 active outputs. In this case, the duty cycle (25%) multiplied with the number of the active outputs (5) is greater than 1. Thus, the PWM drive pulses will be overlapping. Accordingly, after every $4^{th}$ clock cycle a new phase (i.e., a new PWM drive signal) starts as follows: phase 1 starts at clock cycle 0; phase 2 starts at clock cycle 4; phase 3 starts at clock cycle 8; phase 4 starts at clock cycle 12; and phase 5 starts clock cycle 16. Thus, with a duty cycle of 25% and the on time equal to 5 cycles, the overlap of the PWM drive signals is one clock cycle as illustrated in FIG. 3. The duty cycle for each output may be adjusted as described above, i.e., it may be increased to 6 clock cycles or reduced to 4 clock cycles, depending on the voltage and current measurements.

The PWM drive pulses from timer 32 are provided to PWM driver 36, which controls MOSFETs 14 and 18 of each circuit 12 when an associated ENABLE signal is activated by duty control circuit 26.

Figure 4:
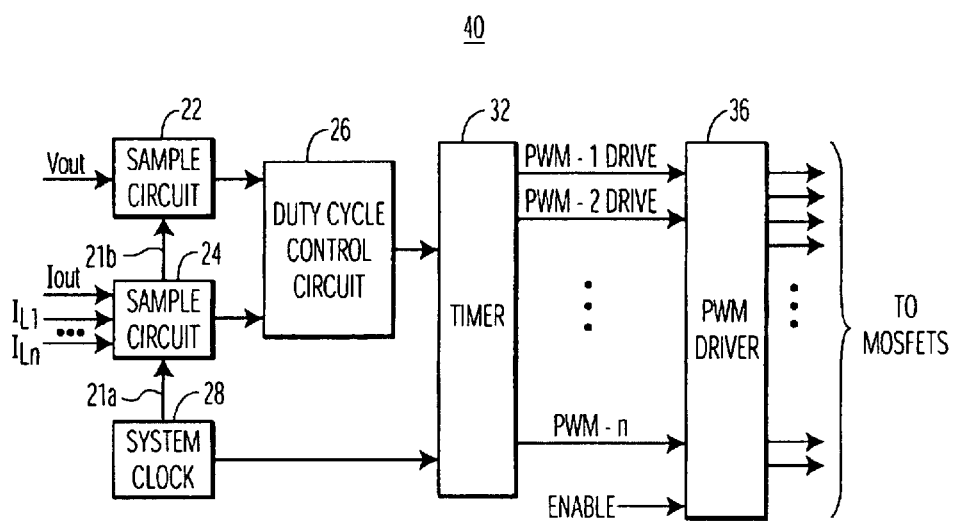
FIG. 4 shows a block diagram of the controller according to a second embodiment of the invention.

FIG. 4 shows a block diagram of a controller 40 according to a second embodiment of the invention. Controller 40 is a variation of controller 20 in FIG. 2 and performs all functions performed by controller 20. In FIG. 4, in addition to $V_{out}$ and $I_{out}$, each coil current $I_L$ is also measured. These current values are digitized by sampling circuit 24. Duty cycle control circuit 26 calculates the average value of these current values and corrects the duty cycle for one or more outputs (i.e., circuits 12) if one or more of the current values are too high or too low, e.g., more than a predetermined threshold value. This embodiment allows for current sharing to realize equal currents through the coils of the active circuits 12. Realizing equal currents gives the highest efficiency possible. Further, it limits the current of each output, which may prevent overcurrent and burning out.

By applying the n phase concept of the invention, the amount of current each phase (i.e., each circuit 12) has to deliver is reduced. This directly reduces the conduction loses in each phase. Because the current in each phase is lower, a smaller MOSFET in each of the n circuits 12 may be used. The smaller MOSFET is easier to switch. Therefore, the switching losses per phase are also reduced. Reducing these losses will enable the invention to achieve efficiencies greater than the discrete solution since 90% of the losses in the conversion process are located in the MOSFETs.

According to the invention, the response time is shortened by integrating the controller with the power train (i.e., the PMW driver and MOSFETs). This integration reduces the parasitic inductances and capacitances that limit the converter's ability to respond quickly. Integration allows all of the components to become physically closer and capable of being switched faster. Faster switching frequencies allow for smaller and less passive components. Integration also minimizes the total cost of the converter.

Increasing the switching frequency of the converter not only shortens response time but also reduces the size of the output inductors required by the buck topology. It may be possible to increase the frequency of the converter to such a point that discrete output inductors are no longer required but that the inductance of the IC package itself may replace them.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. An integrated buck converter, comprising:
   a controller; and
   a plurality of circuits each operably connected to the controller, the plurality of circuits generate a plurality of current signals respectively and an output voltage signal;
   wherein the controller and the plurality of circuits are integrated;
   wherein the controller generates a plurality of drive signals to control the plurality of circuits respectively, the plurality of drive signals each having an associated phase;
   wherein the output voltage signal is fed back to the controller;
   wherein the controller comprises a duty cycle control circuit that compares she fed-back output voltage signal with a pre-selected reference voltage and adjusts a duty cycle value of the drive signals based on the comparison to maintain the output voltage signal at a desired level.

2. The converter of claim 1, wherein the plurality of drive signals have their associated phases overlapped one another if the duty cycle value multiplied by the number of the plurality circuits that axe active is greater than one.

3. The converter of claim 1,
   wherein a sum of she plurality of current signals is fed back to the controller;
   wherein the controller comprises a duty cycle control circuit that compares the sum of the fed-back current signals with a previous value of the sum and adjusts a duty cycle value of the drive signals based on the comparison.

4. The converter of claim 1,
   wherein the plurality of current signals are fed back to the controller;
   wherein the controller comprises a duty cycle control circuit that calculates an average value of the fed-back current signals, compares the average value with each of the fed-back current signals and adjusts a duty cycle value for a corresponding drive signal based on the comparison.

5. The converter of claim 1, wherein the controller further includes:
   a system clock circuit that generates system clock signals, and
   a timing circuit, responsive to the duty cycle control circuit and the system clock circuit, that generates the drive signals in accordance with the duty cycle value provided by the duty control circuit.

6. The converter of claim 3, wherein the controller disables a selected number of the plurality of circuits when the sum of the plurality of current signals is below a predetermined value.

7. The converter of claim 6, wherein the controller disables the selected number of the plurality of circuits in proportion to a power level of the plurality of circuits.

8. An integrated bock converter, comprising:
   a controller, and
   a plurality of circuits each operably connected to the controller;
   wherein the controller and the plurality of circuits are integrated;
   wherein the controller generates a plurality of drive signals to control the plurality of circuits respectively to generate a plurality of current signals and an output voltage signal, the plurality of drive signals each having an associated phase;
   wherein the output voltage signal and a sum of the plurality of current signals are fed back to the controller;
   wherein the controller comprises a duty cycle control circuit that compares the fed-back output voltage signal with a pre-selected reference voltage;
   wherein the controller compares the sum of the fed-back current signals with a previous value of the sum;
   wherein the controller adjusts a duty cycle value of the drive signals based on the voltage and current comparisons to maintain the output voltage signal at a desired level.

9. The converter of claim 8, wherein the controller further includes:
   a system clock circuit that generates system clock signals, and
   a timing circuit, responsive to the duty cycle control circuit and the system clock circuit, that generates the drive signals in accordance with the duty cycle value provided by the duty control circuit.

10. The converter of claim 8, wherein the controller disables a selected number of the plurality of circuits when the sum of the plurality of current signals is below a predetermined value.

11. The converter of claim 10, wherein die controller disables a selected number of the plurality of circuits in proportion to a power level of the plurality of circuits.

12. The converter of claim 8, wherein the plurality of drive signals have their associated phases overlapped one another if the duty cycle value multiplied by the number of the plurality circuits that are active is greater titan one.

13. The converter of claim 8,
   wherein the plurality of current signals are fed back to the controller;
   wherein the duty cycle control circuit calculates an average value of the fed-back current signals, compares the average value with each of the fed-back current signals and adjusts a duty cycle value for a corresponding drive signal based on the comparison.

14. The converter of claim 13, wherein the controller further includes:
- a system clock circuit that generates system clock signals, and
- a timing circuit, responsive to the duty cycle control circuit and the system clock circuit, that generates the drive signals in accordance with the duty cycle value provided by the duty control circuit.

15. The converter of claim 13, wherein the controller disables a selected number of the plurality of circuits when the sum of the plurality of current signals is below a predetermined value.

16. The converter of claim 15, wherein the controller disables a selected number of the plurality of circuits in proportion to a power level of die plurality of circuits.

17. The converter of claim 13, wherein the plurality of drive signals have their associated phases overlapped one another if the duty cycle value multiplied by the number of the plurality circuits that are active is greater than one.

* * * * *